United States Patent [19]

Mahoney

[11] Patent Number: 5,255,354
[45] Date of Patent: Oct. 19, 1993

[54] COMPARISON OF IMAGE SHAPES BASED ON NEAR NEIGHBOR DATA

[75] Inventor: James V. Mahoney, Sunnyvale, Calif.

[73] Assignee: Xerox Corporation, Stamford, Conn.

[21] Appl. No.: 535,091

[22] Filed: Jun. 8, 1990

[51] Int. Cl.$^5$ .............................................. G06F 15/62
[52] U.S. Cl. ..................................... 395/133; 395/128; 395/135
[58] Field of Search ................. 395/133, 141, 128–130, 395/133–135

[56] References Cited

U.S. PATENT DOCUMENTS

| | | | |
|---|---|---|---|
| 3,339,179 | 6/1962 | Shelton, Jr. et al. | 340/146.3 |
| 3,605,093 | 9/1971 | Parks et al. | 340/146.3 |
| 4,208,652 | 6/1980 | Marshall | 340/146.3 |
| 4,615,013 | 9/1986 | Yan et al. | 395/130 |
| 4,799,270 | 1/1989 | Kim et al. | 382/27 |
| 5,022,091 | 6/1991 | Carlson | 382/49 |
| 5,131,054 | 7/1992 | Smith | 382/27 |
| 5,193,125 | 3/1993 | Mahoney | 382/41 |

OTHER PUBLICATIONS

Burr, D. J., "A Dynamic Model for Image Registration," *Computer Graphics and Image Processing*, 15, 1981, pp. 102–112.

Ullman, S., "An Approach to Object Recognition: Aligning Pictorial Descriptions," A.I. Memo No. 931, Dec. 1986, M.I.T. Artificial Intelligence Laboratory, Cambridge, Mass.

Burr, D. J., "Matching Elastic Templates," in Braddick, O. J. and Sleigh, A. C., Eds., *Physical and Biological Processing of Images*, New York: Springer-Verlag, 1983, pp. 260–270.

Huttenlocker, D. P., "Three-Dimensional Recognition of Solid Objects from a Two-Dimensional Image," MIT Artificial Intelligence Laboratory Technical Report TR-1045, 1988, pp. 9–51 and 107–130.

Barrow, H. G., Tenenbaum, J. M., Bolles, R. C., and Wolf, H. C., "Parametric Correspondence and Chamfer Matching," Technical Note 153, SRI International, Menlo Park, Calif., 1977.

Mahoney, James V., "Exhaustive Directional Neighbor Linking and its Role in Image Analysis," *Canadian Psychology/Psychologie Canadienne*, May 1989, vol. 30, No. 2a, p. 440.

*Primary Examiner*—Heather R. Herndon
*Assistant Examiner*—Almis Jankus

[57] ABSTRACT

Shapes are compared by obtaining a measure of dissimilarity based on near neighbor data. First, an image of one shape is analyzed to obtain, for each pixel position, a distance to the nearest pixel that meets a criterion, such as a black pixel. Then, a sum of distances is obtained by totalling the distances of the pixel positions at which an image of another shape meets the criterion. The sum indicates dissimilarity. The near neighbor distances and sum can be obtained by hierarchical operations.

10 Claims, 3 Drawing Sheets

COMPARISON OF IMAGE SHAPES BASED ON NEAR NEIGHBOR DATA

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to techniques for analyzing a body of data. More specifically, the invention relates to techniques that analyze an image by finding near neighbors of pixels in the image.

Burr, D. J., "A Dynamic Model for Image Registration," *Computer Graphics and Image Processing,* "15, 1981, pp. 102–112, describes an iterative technique for updating the local registration of two images. The introduction indicates that nearest neighbor correspondences become better registration indicators as misregistration decreases. Section 3 on pages 104–106 describes the use of a sum of nearest neighbor edge element distances as a spatial distance measure. FIG. 1 shows vectors indicating nearest neighbors for two overlaid images.

Ullman, S., "An Approach to Object Recognition: Aligning Pictorial Descriptions," A.I. Memo No. 931, December 1986, M.I.T. Artificial Intelligence Laboratory, Cambridge, Mass., describes a two stage recognition process. The first stage determines the transformation in space that is necessary to bring the viewed object into alignment with possible object-models. The second stage determines the model that best matches the viewed object. Page 7 describes a typical similarity measure used in associative memories called the Hamming distance, defined for two binary vectors as the number of coordinates in which they disagree. Section 4, beginning on page 20, describes an alignment approach that searches a space of all stored object-models and all of their possible views for a particular model and a particular transformation that maximizes some measure of fit between the object and the model. Page 48 discusses general requirements of measures of the degree of match.

SUMMARY OF THE INVENTION

One aspect of the invention is based on the recognition of problems in measuring similarity between shapes in an image. Some conventional techniques produce a list of pairs of corresponding points on the boundaries of two shapes being matched, then sequentially produce a measure of similarity using the distances between corresponding points. But shapes in an image often lack continuous boundaries, and pairs of shapes may have boundaries for which it is difficult to find corresponding points.

This aspect of the invention is based on the discovery that near neighbor techniques can measure similarity yet avoid these problems. Near neighbor distance data can be produced for each pixel in one of the images being compared, indicating a distance to a near neighbor. Then, the near neighbor distances for each black pixel in the other image can be summed to produce a measure of dissimilarity.

These steps can be implemented in parallel, with a processing unit for each pixel position at which a pixel of one image maps onto a respective pixel of the other image. Hierarchical near neighbor operations can label each pixel with one or more distance values to near neighbors, by storing appropriate data in the local memory of the respective processing unit. If more than one distance value is produced for each pixel, each pixel's processing unit can produce its near neighbor distance data from the pixel's distance values, such as by selecting the smallest distance value. Then, an upward hierarchical pass can produce the sum of near neighbor distances that measures similarity.

To compare images in this manner, it is necessary to normalize them. For example, one of the images may be treated as a template, and the other image may be realigned prior to comparing. Or both images may be converted into a canonical form to facilitate comparison.

The following description, the drawings, and the claims further set forth these and other objects, features and advantages of the invention.

DETAILED DESCRIPTION

A. Conceptual Framework

The following conceptual framework is helpful in understanding the broad scope of the invention, and the terms defined below have the meanings indicated throughout this application, including the claims. This conceptual framework is an extension of that set forth in the copending, coassigned U.S. patent applications Ser. No. 07/535,796, entitled "Dense Aggregative Hierarchical Techniques for Data Analysis" ("the architecture application"), and Ser. No. 07/535,438, entitled "Exhaustive Hierarchical Near Neighbor Operations on an Image" ("the linking application"), which are both incorporated herein by reference in their entireties.

A "data processor" or "processor" is any component, combination of components, or system that can process data, and may include one or more central processing units or other processing components. A "processing unit" is a processor that is a component within another processor. Two processing units are "connected" by any combination of connections between them that permits communication of data from one of the processing units to the other.

"Memory" is any component, combination of components, or system that can store data, and may include local and remote memory and input/output devices.

A processor "accesses" data by any operation that retrieves or modifies the data, such as by reading or writing data at a location in memory. A processor can be "connected for accessing" data by any combination of connections with memory that permits the processor to access the data.

A processor "operates on" data by performing an operation that includes obtaining a logical or numerical result that depends on the data.

To "obtain" or "produce" data is to perform any combination of operations that begins without the data and that results in the data. Data can be "obtained from" or "produced from" other data by any combination of operations that obtains or produces the data by operating on the other data.

Data "indicates" an attribute when the data indicates the presence of the attribute or a measure of the attribute.

A "hierarchy" of data items includes data items, each of which is at one of a series of levels within the hierarchy. To "produce" a hierarchy of data items is to perform a combination of operations that begins without the complete hierarchy of data items and that includes the production of all of the data items of the hierarchy that are not present at the beginning. In other words, a hierarchy may be produced by a combination of operations that ends when all of the data items of the hierarchy have been produced, whether or not all of the data items are still stored. All of the data items of all of the levels could still be stored at the end of the operations, but the hierarchy is produced even though some of the data items are not stored after being used to produce data items at a higher level.

A "hierarchical operation" is a combination of operations that sequentially produce a hierarchy of data items or that make an upward or downward pass through a hierarchy of data items.

Data "indicates" an attribute when the data indicates the presence of the attribute or a measure of the attribute.

An "image" is a pattern of light. Data "defines" an image or another signal when the data includes sufficient information to produce the image or signal.

Each location in an image may be called a "pixel." In an array defining an image in which each item of data provides a value, each value indicating the color of a location may be called a "pixel value."

A "connected component" or "blob" is a set of pixels in an image, all of which have pixel values that meet a criterion and all of which are pairwise connected through an appropriate rule such as that the pixels in a pair are connected by a chain of neighbors within the set. For example, a connected component of a binary form of an image can include a connected set of pixels that have the same binary value, such as black.

The "relative orientation" between two pixels in an image is a measure of the direction within the image from one of the pixels to the other.

The "distance" between two pixels in an image is a measure of the number of pixels between them, assuming generally uniform pixel size and shape. In a two-dimensional image, for example, the distance between two pixels can be measured by x- and y-offsets, and distances can be compared by taking the sums of squares of the offsets. Two pixels are "near" when the distance between them is relatively small, considered in some context.

A "near neighbor pixel" or a "near neighbor" for a given pixel in an image is a pixel in the same image that meets a criterion, referred to herein as a "near neighbor criterion," and which is near to the given pixel when considered in relation to other pixels that meet the criterion. For example, the criterion could be that the near neighbor pixel must be a black pixel, in which case the near neighbors of the given pixel would be nearby black pixels. The determination of which pixels are near may be made in any appropriate way, unless otherwise specified.

"Near neighbor attribute data" is data indicating an attribute relating to a near neighbor pixel. For example, near neighbor attribute data could be "near neighbor distance data" indicating a distance, "near neighbor orientation data" indicating an orientation, or any data indicating an attribute for the near neighbor pixel. Near neighbor attribute data need not uniquely identify a near neighbor pixel, and may relate to a set of more than one near neighbor pixels.

A "near neighbor link" is the relationship between a pixel, called an "owner," and a near neighbor pixel, called a "neighbor." Therefore, near neighbor attribute data can provide information about a near neighbor link.

B. General Features

Figure 1:
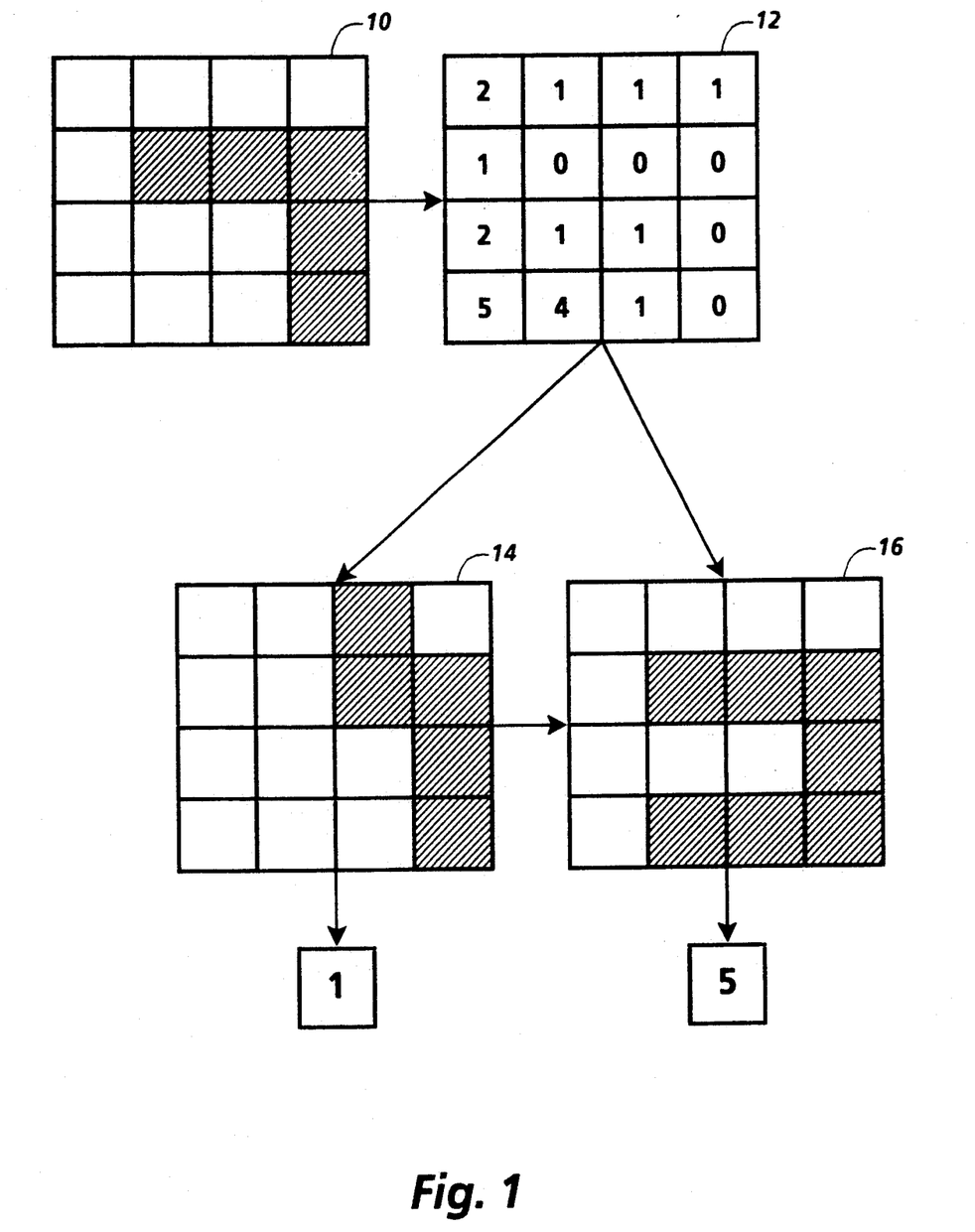
FIG. 1 is a flow diagram showing a sequence of arrays illustrating shape comparison according to the invention.
Figure 2:
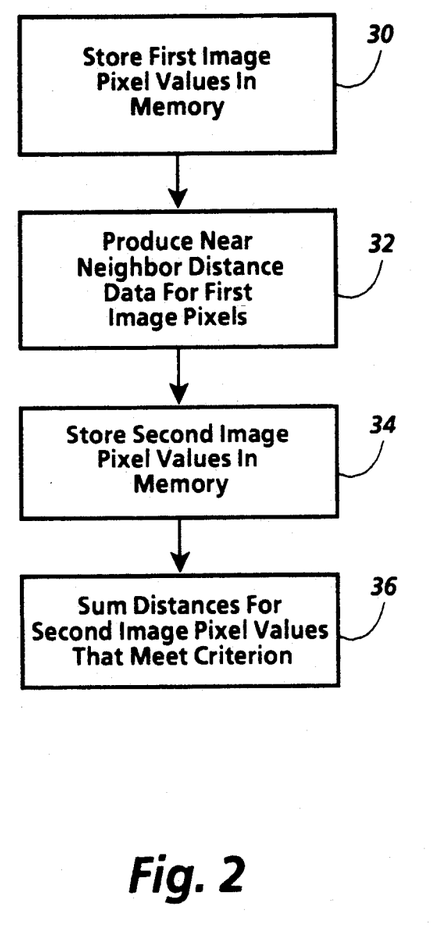
FIG. 2 is a flow chart showing general steps in obtaining a measure of similarity between two images according to the invention.

FIGS. 1–2 illustrate general features of the invention. FIG. 1 shows a sequence of arrays in comparing shapes based on near neighbor data. FIG. 2 shows general steps in measuring dissimilarity between images by obtaining a sum of near neighbor distances.

FIG. 1 shows pixel array 10, which includes a shape formed by five black pixels. Array 12 is an array of near neighbor data produced by operating on the data in array 10 to obtain, for each pixel, a sum of squares distance to the nearest black pixel. For each black pixel position in array 10, the distance in array 12 is zero. For each white pixel position, the distance in array 12 is greater than zero, being the sum of squares of the x- and y-coordinate offsets to the nearest black pixel. Operations like those described in the linking application could be performed to produce array 12 from array 10.

Pixel array 14 shows a second shape formed by five black pixels, while pixel array 16 shows a third shape formed by seven black pixels. As shown, if the distances in array 12 for each black position in array 14 are totalled, the sum is one. But the sum for array 16 is five, indicating that array 16 is more dissimilar from array 10 than array 14.

FIG. 2 shows general steps in measuring similarity between images based on near neighbor distances. The step in box 30 stores pixel values of a first image in memory. The step in box 32 produces near neighbor distance data for each pixel in the first image, indicating the distance to a near neighbor pixel that meets a criterion, such as a black pixel. The step in box 34 stores pixel values of a second image in memory. The step in box 36 then sums the distances for pixels in the second image that meet the criterion, such as black pixels, to produce a measure of similarity. In the method shown in FIG. 2, the step in box 34 could be performed at any point prior to the step in box 36.

C. An Implementation

Figure 3:
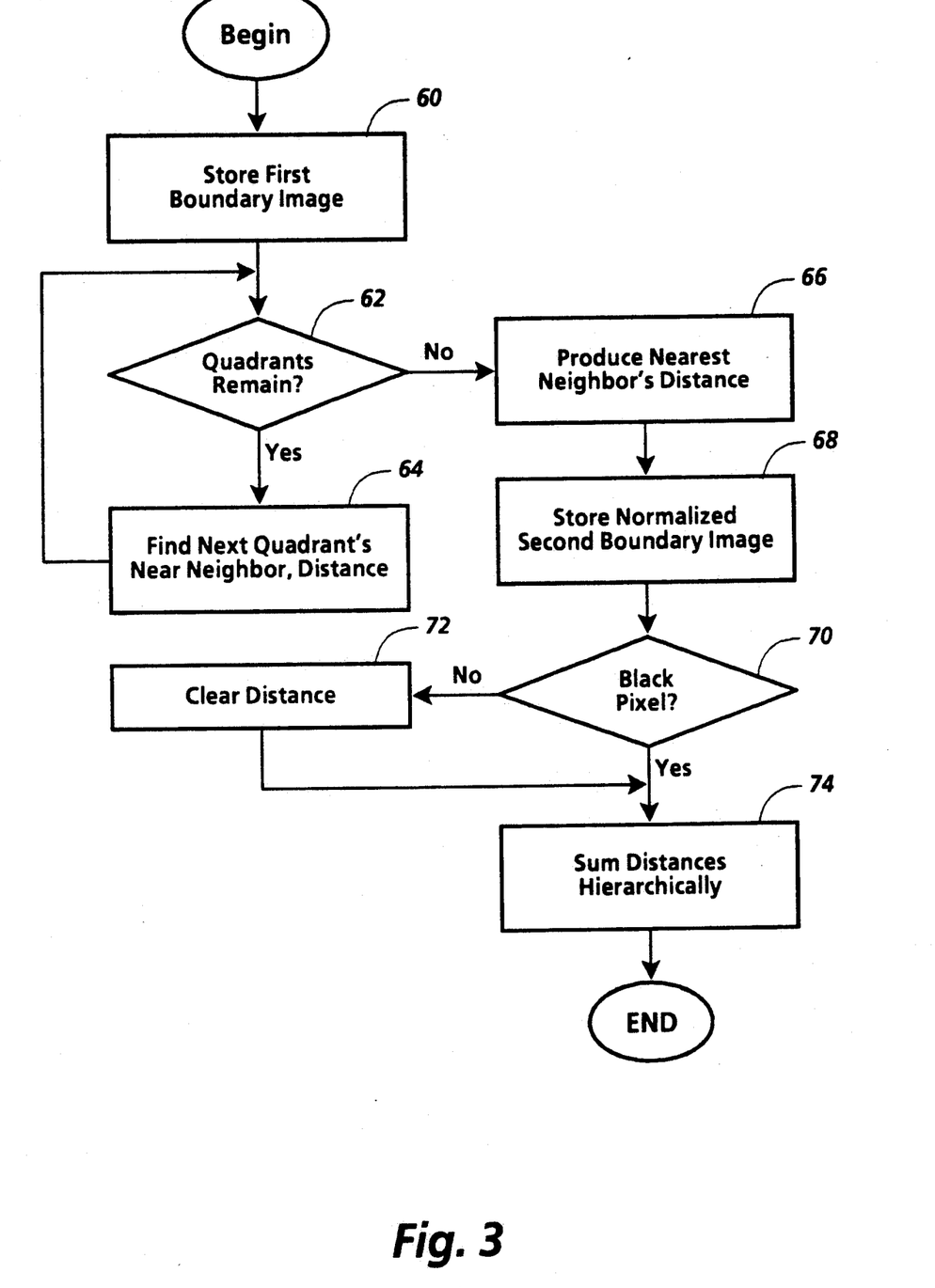
FIG. 3 is a flow chart showing steps in obtaining a measure of similarity between two images.

FIG. 3 shows how a vision system can perform shape matching based on boundaries, using near neighbor data. The step in box 60 begins by storing a first image of a boundary so that each processing unit's local memory contains the respective pixel's value.

The step in box 62 begins an iterative loop that, for each quadrant, finds the near neighbor and its distance, in box 64. When all the near neighbors have been found, the step in box 66 obtains near neighbor data indicating the distance to the nearest of the near neighbors.

The step in box 68 could be performed somewhat independently of the preceding steps, since it involves normalizing a second image to be compared with the first image and then storing the normalized second image so that each processing unit's local memory contains the respective pixel's value.

The normalization could, for example, produce a figure whose bounding rectangle is identical to that of a figure in the first image. The step in box 70 determines, at each processing unit, whether its respective pixel in the normalized second image is black. If not, its distance from box 66 is cleared for purposes of the step in box 74, which sums the remaining distances hierarchically over all the processing units to obtain a measure of the difference in shape between the boundaries in the first and second images.

The operation described above could be used in template matching, with the first image being a prototype and the second image being compared to the prototype by a process involving two simple stages. The first stage is a normalization or alignment process, which transforms a given plane figure into a canonical form, essentially undoing allowed variations in shape due to viewing position, physical deformations of the viewed object, and so on. The second stage, the template matching, compares the normalized figure to the prototype by obtaining a sum as described above in relation to box 74.

An advantage of near neighbor links over representations of near-neighbor distance alone for boundary-based shape matching is that other relevant information associated with corresponding boundary locations, such as orientation and curvature, can be included in the similarity measure. In this case, at each black pixel in the normalized second image, the relevant properties are read from the neighbor location and included in the overall measure in some fashion.

D. Source Code Appendix

Appendix A is *Lisp source code implementing some of the features described above. The source code in Appendix A may differ in some respects from the above description, but execution of the source code in Appendix A on a Connection Machine provides substantially all the features described above. In some cases, the code has been optimized or includes additional features. Source code implementing other features is included in copending coassigned U.S. patent application Ser. No. 07/535,438, entitled "Exhaustive Hierarchical Near Neighbor Operations on an Image" and Ser. No. 07/535,796, entitled "Dense Aggregative Hierarchical Techniques for Data Analysis," both of which are incorporated herein by reference in their entireties.

The following are included in Appendix A:

The function ADD-MODEL produces a map indicating, for each pixel of a model image, a near neighbor distance.

The function MATCH-FIGURE produces a sum of near neighbor distances from the map produced by ADD-MODEL by adding the distance at each pixel location where an image being matched has a different pixel value than the model image.

E. Miscellaneous

The invention has been described in terms of operations on binary images, but could be applied to images of all types and, more generally, to bodies of data that map into arrays similar to those described.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

Ⓒ 1990 Xerox Corporation. All rights reserved.

APPENDIX A

;; -*- Syntax: Common-lisp; mode: lisp; package: REVERSE-GRAPHICS; base: 10 -*-

;;;
;;;
;;; Shape-model management and pseudo-elastic template matching.
;;;
;;;

;;; ------------------------------------------------------------
;;;
;;;

;;; Each model-slot can hold (square (truncate analyze-dim model-width))
;;; models. Models are indexed continuosly across model slots, starting
;;; from 1.

(defvar model-width 64.)

(defun make-model-pvar-labels (labels width start-val)
  (*locally

```
    (declare (type (field-pvar (pvar-length labels)) labels))
    (*set labels (+!! (*!! (floor!! (self-address-grid!! (!! 1)) (!!f width))
                           (!!f (floor analyze-dim width)))
                      (floor!! (self-address-grid!! (!! 0)) (!!f width))
                      (!!f start-val)))))

(defun make-model-set-labels (model-label-pvars)
  (let ((models-per-set (square (truncate analyze-dim model-width))))
    (loop for model-label-pvar in model-label-pvars
          for start-val from 1 by models-per-set do
          (make-model-pvar-labels model-label-pvar model-width start-val))))

;;;------------------------------------------------------------
;;;
;;;

;; I could home the figure just using power-of-two shifts, but I would
;; still have to cheat to scale it. (defun home-figure ())

(defun home-and-scale-figure (figure homed width)
  (let* ((left (readout-left figure))
         (top (readout-top figure))
         (spans (readout-spans figure))
         (fig-width (max (first spans) (second spans))))
    (*locally
      (declare (type (field-pvar 1) figure homed))
      (*set homed (!! 0))
      (*unless (or!! (>=!! (self-address-grid!! (!! 0)) (!!f width))
                     (>=!! (self-address-grid!! (!! 1)) (!!f width)))
        (*let ((xx (+!! (truncate!! (*!! (self-address-grid!! (!! 0))
                                         (!!f fig-width))
                                    (!!f width))
                        (!!f left)))
               (yy (+!! (truncate!! (*!! (self-address-grid!! (!! 1))
                                         (!!f fig-width))
                                    (!!f width))
                        (!!f top))))
          (declare (type (signed-pvar 16) xx yy))
          (*unless (bpv (off-grid-border-p!! xx yy))
            (*set homed
                  (fpvl (pref!! figure (cube-from-grid-address!! xx yy)
                                :collision-mode :many-collisions) 1)))))
      (*when (or!! (>=!! (self-address-grid!! (!! 0)) (!!f width))
                   (>=!! (self-address-grid!! (!! 1)) (!!f width)))
        (*set homed (!! 0))))))

(defun replicate-figure (figure width)
  (*locally
    (declare (type (field-pvar 1) figure))
    (let ((hstart (+ (parent-level-from-width width) 2))
          (vstart (+ (parent-level-from-width width) 1))
          (stop top-chunking-level))
      (loop for l from hstart to stop by 2 do ; (display 'active) (morep "*")
        (*set figure (max!! (qchild-ref!! figure 2 l 3) figure)))
      (loop for l from vstart to (+ stop 2) by 2 do ; (display 'active) (morep ".")
        (*set figure (max!! (qchild-ref!! figure 2 l 2) figure))))))
```

```
;;
(defun home-scale-and-replicate-figure (figure match width)
  (home-and-scale-figure figure match width)
  (replicate-figure match width))

(defun get-model-dists (figure model-dists)
  (*locally
    (declare (type (field-pvar 1) figure)
         (type (field-pvar (pvar-length model-dists)) model-dists))
    (*let (ground)
      (declare (type (field-pvar 1) ground))
      (*set ground figure)
      (*set ground (not01!! ground))

(with-link-data (figure :links links)
        (*let-fields quad-pvars 4 8
          (link-distance-sort figure links quad-pvars)
          (for-nearest-neighbor (quad-pvars :quad q)
            (*set model-dists (fpv (nth (1- q) dist-slots))))))

(with-link-data (ground :links links)
        (*let-fields quad-pvars 4 8
          (link-distance-sort ground links quad-pvars)
          (for-nearest-neighbor (quad-pvars :quad q)
            (*set model-dists (max!! (fpv (nth (1- q) dist-slots))
                      model-dists))))))))

;;;--------------------------------------------------------------------
(*defun mark-tree (tree-pvar stop-level &optional (tree '(0 0)))
  (declare (type (field-pvar 1) tree-pvar))
  (*let ((suppvar (!! 0)))
    (declare (type (field-pvar 1) suppvar))
    (setf (pref-grid tree-pvar (first tree) (second tree)) 1)
    (loop for l from top-chunking-level downto (1+ stop-level) do
      (*when (plusp!! tree-pvar)
        (*unless (plusp!! suppvar)
          (*set suppvar (!! 1))))
      (setf (child-ref!! tree-pvar 2 l)
        (max!! tree-pvar (child-ref!! tree-pvar 2 l)))
      (setf (child-ref!! suppvar 2 l)
        (max!! suppvar (child-ref!! suppvar 2 l))))))

(defun model-set-free-label
    (model-label-pvars model-figure-pvars
     &aux (top-l (parent-level-from-width model-width)))
  (loop for model-labels in model-label-pvars
    for model-figure-pvar in model-figure-pvars do
    (*locally
      (declare (type (field-pvar 1) model-figure-pvar)
           (type (field-pvar (pvar-length model-labels)) model-labels))
      (*let ((sum (!! 0)))
        (declare (type (field-pvar 16) sum))
        (*set sum model-figure-pvar)
        (loop for l from 1 to top-l do
```

```
        (*set sum (+!! (child-ref!! sum 1 l)
              (child-ref!! sum 2 l))))
       (*let ((nodes (!! 0)))
        (declare (type (field-pvar 1) nodes))
        (mark-tree nodes top-l '(0 0))
        (*when (zerop!! nodes)
         (*set sum (!! 100.)))
        (*let ((label (!! 0)))
         (declare (type (field-pvar (pvar-length model-labels)) label))
         (*when (zerop!! sum)
          (*set label model-labels))
         (if (plusp (*sum label))
           (return (readout-min label (!! 1)))))))))))

(defun ADD-MODEL (figure model-set)
  (let ((model-figure-pvars (model-set-figures model-set))
        (model-dist-pvars (model-set-dists model-set))
        (model-label-pvars (model-set-labels model-set)))
    (let ((model-set-free-label (model-set-free-label model-label-pvars model-figure-pvars)))
      (if model-set-free-label
        (let* ((models-per-set (square (truncate analyze-dim model-width)))
               (model-set-index (1- (ceiling model-set-free-label models-per-set)))
               (model-dist-pvar (nth model-set-index model-dist-pvars))
               (model-figure-pvar (nth model-set-index model-figure-pvars))
               (model-label-pvar (nth model-set-index model-label-pvars)))
          (*locally
           (declare (type (field-pvar 1) model-figure-pvar)
                (type (field-pvar (pvar-length model-label-pvar)) model-label-pvar)
                (type (field-pvar (pvar-length model-dist-pvar)) model-dist-pvar))
           (*let (match)
            (declare (type (field-pvar 1) match))
            (*let (dist)
             (declare (type (field-pvar 16) dist))
             (home-scale-and-replicate-figure
               figure match model-width)
             (*unless (=!! model-label-pvar (!!f model-set-free-label))
              (*set match (!! 0)))
             (get-model-dists match dist)
             (*unless (=!! model-label-pvar (!!f model-set-free-label))
              (*set dist (!! 0)))
             (*when (=!! model-label-pvar (!!f model-set-free-label))
              (*set model-figure-pvar match)
              (*set model-dist-pvar dist))))))
        (format t "~%  No free space to add model.")))))

;; This will leave the model's space blank.  The next add-model will use
;; that space.
(defun DELETE-MODEL (index model-set)
  (let ((model-figure-pvars (model-set-figures model-set))
        (model-dist-pvars (model-set-dists model-set))
        (model-label-pvars (model-set-labels model-set)))
    (loop for model-label-pvar in model-label-pvars
          for model-dist-pvar in model-dist-pvars
          for model-figure-pvar in model-figure-pvars do
      (*when (=!! (fpv model-label-pvar) (!!f index))
```

```
       (*set (fpvl model-figure-pvar 1) (!! 0))
       (*set (fpv model-dist-pvar) (!! 0))))))
```

```
;;;-----------------------------------------------------------------
;;;

;; The value of the match at a point is 0 if model image and match image
;; are the same color. It is the value of the distance map otherwise.
;; The function sums the match values for all points of each model and
;; returns the label and sum for the model that minimizes the sum (and
;; maximizes the label, if there are ties.).

(defun get-min-sigma-label-and-distance
      (replicated-figure model-figures model-dists model-labels model-width
       &aux (top-l (parent-level-from-width model-width)))
  (*locally
    (declare (type (field-pvar 1) replicated-figure model-figures)
         (type (field-pvar (pvar-length model-dists)) model-dists)
         (type (field-pvar (pvar-length model-labels)) model-labels))
    (*let ((dist (!! 0)))
      (declare (type (field-pvar 16) dist))
      (*when (not!! (=!! replicated-figure model-figures))
        (*set dist model-dists))
      (loop for l from 1 to top-l do
        (*set dist (+!! (child-ref!! dist 1 l)
                (child-ref!! dist 2 l))))
      (*let ((nodes (!! 0)))
       (declare (type (field-pvar 1) nodes))
       (mark-tree nodes top-l '(0 0))
       (*when (zerop!! nodes)
         (*set dist (!! 0)))
       (let ((min-dist (readout-min dist (!! 1))))
         (*set nodes (!! 0))
         (*when (=!! dist (!!f min-dist))
           (*set nodes (!! 1)))
         (*let ((label (!! 0)))
           (declare (type (field-pvar (pvar-length model-labels)) label))
           (*when (plusp!! nodes)
             (*set label model-labels))
           (list (*max label) min-dist)))))))

(defun MATCH-FIGURE (figure model-set label-register &optional dist-register)
  (let ((model-figure-pvars (model-set-figures model-set))
        (model-dist-pvars (model-set-dists model-set))
        (model-label-pvars (model-set-labels model-set)))
    (*let (match)
      (declare (type (field-pvar 1) match))
      (home-scale-and-replicate-figure figure match model-width)
      (let (label dist)
        (loop for model-figure-pvar in model-figure-pvars
              for model-dist-pvar in model-dist-pvars
              for model-label-pvar in model-label-pvars
              for results =
                (get-min-sigma-label-and-distance
                  match model-figure-pvar model-dist-pvar model-label-pvar model-width)
```

```
for label1 = (first results)
for dist1 = (second results)
when (or (null dist) (< dist1 dist))
  do (setq label label1 dist dist1))
(setr label-register label)
(when dist-register
  (setr dist-register dist))))))
```

---

What is claimed:

1. A method of operating a system that includes memory and a processor, the processor including a plurality of processing units, each processing unit being connected for accessing data stored in the memory, the method comprising steps of:

for a first image that includes a plurality of pixels, storing in the memory a respective data item for each pixel, each pixel's respective data item including a first image pixel value; the respective data item of each pixel in the first image being stored so that a respective processing unit for the pixel can access the pixel's respective data item;

operating the processing units to produce, for each of the pixels in the first image, near neighbor distance data for the pixel, the near neighbor distance data indicating a distance to a near neighbor pixel whose first image pixel value meets a criterion; each pixel's processing unit producing the near neighbor distance data by operating on the pixel's respective data item; the step of operating the processing units to produce near neighbor distance data comprising substeps of:

finding, for each pixel in the first image, a set of near neighbor pixels that includes the near neighbor pixel; and performing a hierarchical operation to produce, for each pixel's set of near neighbor pixels, a set of distance values indicating the distances to the near neighbor pixels;

for a second image that includes a plurality of pixels, each mapping to a respective pixel of the first image, storing in the memory a respective data item for each pixel, each pixel's respective data item including a second image pixel value; the respective data item of each pixel in the second image being stored so that it can be accessed by a respective processing unit for the pixel; each pixel in the second image and the respective pixel of the first image both having the same respective processing unit; the pixels of the second image including a set of pixels whose pixel values meet the criterion; and operating the processor to produce a measure of dissimilarity between the first and second images; the step of operating the processor to produce the measure of dissimilarity comprising a substep of producing, for the set of pixels of the second image whose pixel values meet the criterion, a sum of distances, the distances being the distances indicated by the near neighbor distance data of the respective pixels of the first image.

2. The method of claim 1 in which the step of operating the processing units to produce the near neighbor distance data further comprises a substep of performing operations with the respective processing unit of each pixel of the first image to produce the pixel's near neighbor distance data.

3. The method of claim 2 in which the step of operating the processor to produce a measure of dissimilarity further comprises a substep of performing a hierarchical operation that adds the near neighbor distance data produced by the respective processing units of the set of pixels of the second image.

4. The method of claim 1 in which the near neighbor distance data of each pixel in the first image indicate a distance to one of the set of near neighbor pixels that is nearest to the pixel.

5. The method of claim 1 in which each pixel value is binary, having either a first value indicating a white pixel or a second value indicating a black pixel, the criterion being that the pixel value have the second value, indicating a black pixel.

6. A method of operating a system that includes memory and a processor connected for accessing the memory, the method comprising steps of:

for a first image that includes a plurality of pixels, storing in the memory a respective data item for each pixel, each pixel's respective data item including a first image pixel value;

operating the processor to produce, for each of the pixels in the first image, near neighbor distance data for the pixel, the near neighbor distance data indicating a distance to a near neighbor pixel whose first image pixel value meets a criterion; the processor producing the near neighbor distance data by operating on the first image pixel values;

operating the processor to produce, for each of the pixels in the first image, near neighbor attribute data for the pixel's near neighbor pixel;

for a second image that includes a plurality of pixels, each mapping to a respective pixel of the first image, storing in the memory a respective data item for each pixel, each pixel's respective data item including a second image pixel value; the pixels of the second image including a set of pixels whose pixel values meet the criterion; and operating the processor to produce a measure of dissimilarity between the first and second images; the step of operating the processor to produce a measure of dissimilarity comprising substeps of:

producing, for the set of pixels of the second image whose pixel values meet the criterion, a sum of distances, the distances being the distances indicated by the near neighbor distance data of the respective pixels of the first image;

using the near neighbor attribute data for the respective first image pixels of the set of second image pixels to produce the measure of dissimilarity.

7. The method of claim 6 in which each first image pixel's near neighbor attribute data indicates an orientation at the pixel's near neighbor pixel.

8. The method of claim 6 in which each first image pixel's near neighbor attribute data indicates a curvature at the pixel's near neighbor pixel.

9. A method of operating a system that includes memory and a processor, the processor including a plurality of processing units, each processing unit being connected for accessing data stored in the memory, the method comprising acts of:

for a first image that includes a plurality of pixels, storing in the memory a respective data item for each pixel, each pixel's respective data item including a first image pixel value; the respective data item of each pixel in the first image being stored so that a respective processing unit for the pixel can access the pixel's respective data item;

operating the processing units to produce, for each of the pixels in the first image, near neighbor distance data for the pixel, the near neighbor distance data indicating a distance to a near neighbor pixel whose first image pixel value meets a criterion; each pixel's processing unit producing the near neighbor distance data by accessing and operating on the pixel's respective data item; the step of operating the processing units to produce near neighbor distance data comprising substeps of:

finding, for each pixel in the first image, a set of near neighbor pixels that includes the near neighbor pixel; and performing a hierarchical operation to produce, for each pixel's set of near neighbor pixels, a set of distance values indicating the distances to the near neighbor pixels;

for a second image that includes a plurality of pixels, each mapping to a respective pixel of the first image, storing in the memory a respective data item for each pixel, each pixel's respective data item including a second image pixel value; the respective data item of each pixel in the second image being stored so that it can be accessed by a respective processing unit for the pixel; each pixel in the second image and the respective pixel of the first image both having the same respective processing unit; the pixels of the second image including pixels whose pixel values meet the criterion; and operating the processor to produce dissimilarity data indicating a measure of dissimilarity between the first and second images by accessing and operating on the second image pixel values and the near neighbor distance data; the act of operating the processor to produce dissimilarity data comprising producing sum data indicating a sum of distances, the distances in the sum including the distance indicated by the near neighbor distance data of the respective pixel of the first image for each pixel in the second image whose pixel value meets the criterion.

10. A method of operating a computer that includes memory and a processor, the processor including a plurality of processing units, each processing unit being connected for accessing data stored in the memory, the method comprising acts of:

obtaining first image data defining a first image that includes a plurality of pixels; the first image data including a respective data item for each pixel, each pixel's respective data item including a first image pixel value;

storing the first image data in the memory; the respective data item of each pixel in the first image being stored so that a respective processing unit for the pixel can access the pixel's respective data item;

operating the processing units to produce, for each of the pixels in the first image, near neighbor distance data for the pixel, the near neighbor distance data indicating a distance to a near neighbor pixel whose first image pixel value meets a criterion; each pixel's processing unit producing the near neighbor distance data by accessing and operating on the pixel's respective data item; the step of operating the processing units to produce near neighbor distance data comprising substeps of:

finding, for each pixel in the first image, a set of near neighbor pixels that includes the near neighbor pixel; and performing a hierarchical operation to produce, for each pixel's set of near neighbor pixels, a set of distance values indicating the distances to the near neighbor pixels;

obtaining second image data defining a second image that includes a plurality of pixels, each mapping to a respective pixel of the first image; the second image data including a respective data item for each pixel, each pixel's respective data item including a second image pixel value; the pixels of the second image including pixels whose pixel values meet the criterion; storing the second image data in the memory; the respective data item of each pixel in the second image being stored so that it can be accessed by a respective processing unit for the pixel; each pixel in the second image and the respective pixel of the first image both having the same respective processing unit; and operating the processor to produce dissimilarity data indicating a measure of dissimilarity between the first and second images by accessing and operating on the second image pixel values and the near neighbor distance data; the act of operating the processor to produce dissimilarity data comprising producing sum data indicating a sum of distances, the distances in the sum including the distance indicated by the near neighbor distance data of the respective pixel of the first image for each pixel in the second image whose pixel value meets the criterion.

* * * * *